United States Patent
Smith et al.

(10) Patent No.: US 10,413,928 B2
(45) Date of Patent: Sep. 17, 2019

(54) WHEEL RIM GUARD

(71) Applicants: Elvin Smith, Charleston, WV (US);
Mark Allen, Mount Nebo, WV (US)

(72) Inventors: Elvin Smith, Charleston, WV (US);
Mark Allen, Mount Nebo, WV (US)

( * ) Notice: Subject to any disclaimer, the term of this patent is extended or adjusted under 35 U.S.C. 154(b) by 0 days.

(21) Appl. No.: 15/962,078

(22) Filed: Apr. 25, 2018

(65) Prior Publication Data

US 2018/0236811 A1 Aug. 23, 2018

Related U.S. Application Data

(63) Continuation-in-part of application No. 15/280,830, filed on Sep. 29, 2016, now abandoned.

(51) Int. Cl.
| | |
|---|---|
| *B05B 12/30* | (2018.01) |
| *B60B 7/00* | (2006.01) |
| *B60B 7/12* | (2006.01) |
| *B60B 7/01* | (2006.01) |
| *B60B 7/04* | (2006.01) |

(52) U.S. Cl.
CPC ............ *B05B 12/30* (2018.02); *B60B 7/0073* (2013.01); *B60B 7/01* (2013.01); *B60B 7/04* (2013.01); *B60B 7/12* (2013.01); *B60B 2900/141* (2013.01)

(58) Field of Classification Search
CPC ........... B60B 7/04; B05B 12/20; B05B 12/00; B05B 12/22; B05B 12/26; B05B 12/30; B05B 3/042
See application file for complete search history.

(56) References Cited

U.S. PATENT DOCUMENTS

| | | | | |
|---|---|---|---|---|
| 2,975,447 | A * | 3/1961 | Vuchinas | B60S 3/042 |
| | | | | 15/53.4 |
| 6,179,387 | B1 * | 1/2001 | Nasset, Sr. | B05B 12/30 |
| | | | | 301/37.102 |
| 6,227,623 | B1 * | 5/2001 | Bellow | B05B 12/30 |
| | | | | 301/37.42 |
| 6,412,878 | B1 | 7/2002 | Bell | |
| 6,464,303 | B2 | 10/2002 | Stembridge | |
| 6,863,353 | B1 * | 3/2005 | Buckner | B60B 7/0073 |
| | | | | 301/37.103 |
| 7,314,524 | B1 * | 1/2008 | Rolleri, Jr. | B60S 3/042 |
| | | | | 118/504 |
| 9,713,819 | B1 * | 7/2017 | Wilson | B60B 7/0073 |
| 2012/0043804 | A1 * | 2/2012 | Nebel | B60B 7/02 |
| | | | | 301/37.104 |
| 2018/0086137 | A1 * | 3/2018 | Smith | B60B 7/04 |

* cited by examiner

*Primary Examiner* — Jason R Bellinger
(74) *Attorney, Agent, or Firm* — York Law LLC; Olen L. York, III

(57) ABSTRACT

A wheel rim guard includes a body having an obverse surface and reverse surface, the surfaces in mutually opposed orientation and having a thickness (t) intermediately disposed between the surfaces and with the surfaces mutually terminating at an outer circumferential periphery. The guard includes a first channel disposed within the reverse surface of the body, and a first flexible gasket disposed within the first channel. The guard also includes a handle disposed on the obverse surface of the body. A holder may be included that clips to the handle of the guard to position the guard for hands-free operation.

13 Claims, 12 Drawing Sheets

WHEEL RIM GUARD

I. RELATED APPLICATIONS

This application is a continuation-in-part of U.S. patent application Ser. No. 15/280,830 filed on Sep. 29, 2016 which is now abandoned.

II. FIELD OF THE INVENTION

This application discloses claims and embodiments generally related to a protective cover for the tire portion of a vehicle or automobile.

III. BACKGROUND OF THE INVENTION

Numerous attempts have been made to improve the application of cleaner to a surface that is adjacent to other surfaces, wherein one surface is intended to receive such cleaning solution and adjacent surfaces are to be cleaned in a separate manner. For example, a vehicle tire is mounted to a wheel rim that is mechanically coupled to the axle of the vehicle. Wheel rims are constructed of a variety of materials, including alloy (magnesium and aluminum), magnesium, aluminum, chrome, and other similar materials. Because such materials are expensive and easily marred or stained, preventing cleaners, polishes, and other such materials that may leave behind residue that may mar or otherwise corrode the wheel rim.

Accordingly, a need exists for an apparatus or device capable of shielding the wheel rim during application of cleaning or polishing materials.

IV. SUMMARY OF THE INVENTION

The present invention provides an improved wheel rim guard apparatus having the general purpose of shielding the wheel rim of a vehicle from inadvertent application of cleaning or polishing material(s) and to prevent staining and/or marring of the wheel rim.

In one embodiment, a wheel-rim guard comprises a body having an obverse surface and reverse surface, the surfaces in mutually opposed orientation and having a thickness intermediately disposed between the surfaces, the surfaces mutually terminating at an outer circumferential periphery. The guard also includes a first channel disposed within the reverse surface of the body, and further includes a first flexible gasket disposed within the first channel. The obverse surface of the body includes a handle disposed thereon.

The apparatus may further comprise a first socket disposed in the reverse surface of the body. The apparatus may also include a body extension having a band, the band comprising an obverse surface and a reverse surface, the surfaces in mutually opposed orientation and terminating at an inner circumferential periphery and at an outer circumferential periphery, the inner circumferential periphery defining a center aperture adapted to accommodate the body therein, the band comprising a first detent mated to the first socket.

In such an embodiment, the band may further comprise a first recess disposed in the obverse surface, the first recess mated with the first flexible gasket disposed within the first channel of the body. The band may further comprise outer flexible gasket disposed adjacent the outer circumferential periphery. The band further comprises an outer channel housing the outer flexible gasket. Moreover, the band further comprises an inner flexible gasket disposed along the inner circumferential periphery of the band. The band further comprises an inner channel housing the inner flexible gasket.

It is envisioned that the body may further comprise a second channel disposed within the reverse surface of the body and a second flexible gasket disposed within the second channel. It is further envisioned that the band may comprise an inner first recess and an outer second recess disposed in the obverse surface, the inner first recess mated with the first flexible gasket disposed within the first channel of the body, the outer second recess mated with the second flexible gasket disposed within the second channel of the body.

In another embodiment, the guard may further comprise a second channel disposed along the outer circumferential periphery and a second flexible gasket disposed within the second channel. The guard may further include an inner first socket and an outer second socket formed in the reverse surface of the body. Moreover, the guard may include a body extension having a band, the band comprising an obverse surface and a reverse surface, the surfaces in mutually opposed orientation and terminating at an inner circumferential periphery and at an outer circumferential periphery, the inner circumferential periphery defining a center aperture adapted to accommodate the body therein, the band comprising an inner first detent mated to the inner first socket and an outer second detent mated to the outer second socket.

In another embodiment, consistent with the several embodiment described above, the guard may further comprise a holder having a plurality of legs, an upstanding first post depending from the legs, a telescopically movable second post housed within the first post, a horizontal arm depending from the second post, and a spring-loaded clip at the terminal end of the horizontal arm attachable to the handle of the guard.

V. BRIEF DESCRIPTION OF THE DRAWING(S)

The advantages and features of the present invention will become better understood with reference to the following more detailed description and claims taken in conjunction with the accompanying drawings, in which like elements are identified with like symbols, and in which:

VI. DETAILED DESCRIPTION OF THE EMBODIMENT(S)

Figure 1A:
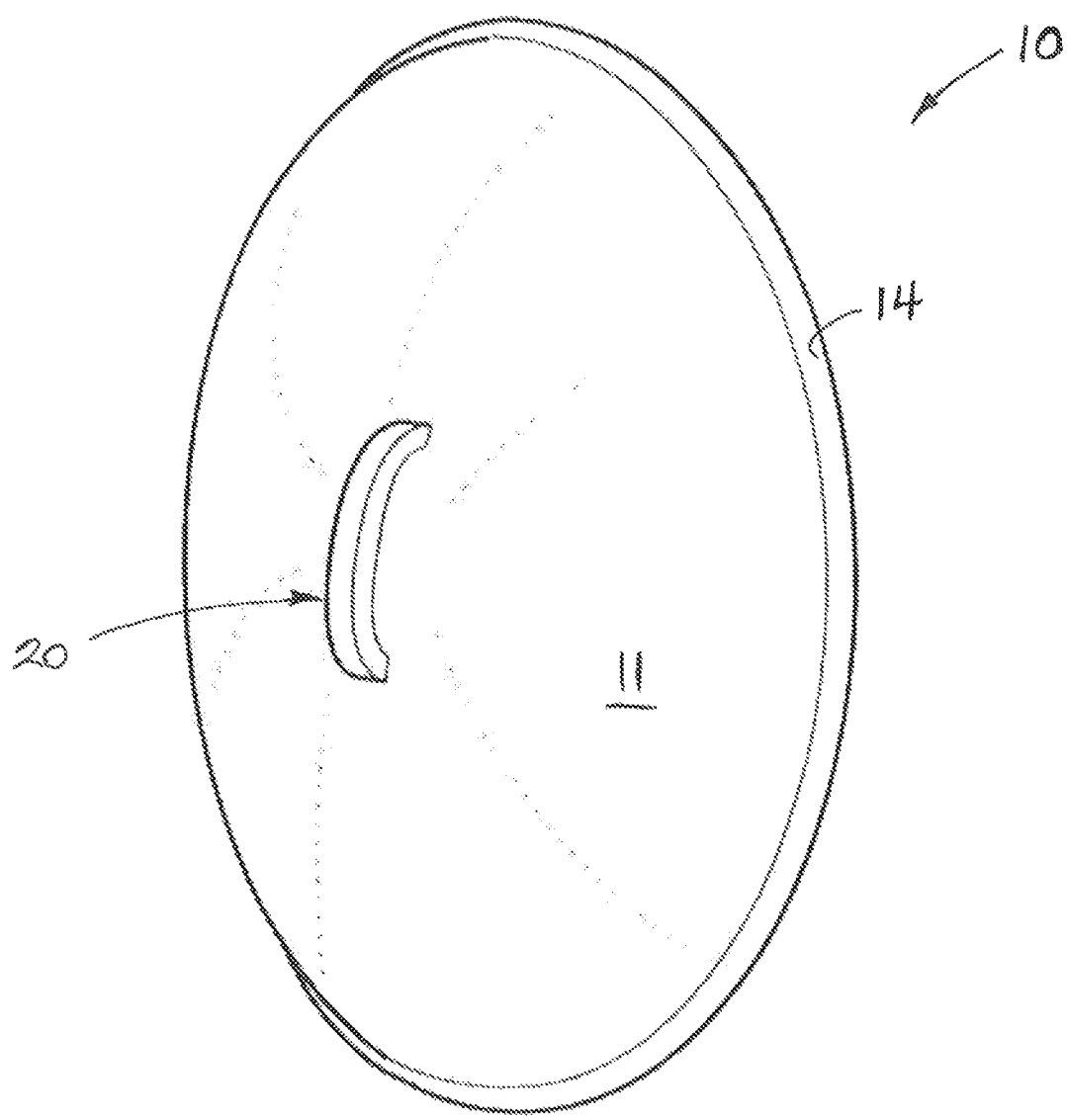
FIG. 1A is a perspective view of a protective wheel rim guard.

It will be readily understood that the components of the present invention, as generally described and illustrated in the figures herein, may be arranged and designed in a wide variety of different configurations. Thus, the following detailed description of the embodiments of pet article, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Referring now to FIGS. 1A, 1B, and 2-4, a wheel-rim guard generally denoted by reference character 10 and is illustrated and described herein, the guard 10 comprising a body 12 having an obverse surface 11 and reverse surface 13, the surfaces 11, 13 in mutually opposed orientation and having a thickness (t) intermediately disposed between the surfaces 11, 13, with the surfaces 11, 13 mutually terminating at an outer circumferential periphery 14. The guard 10 includes a first channel 16 disposed within the reverse surface 13 of the body 12, and a first flexible gasket 18 disposed within the first channel 16. The guard 10 also includes a handle 20 disposed on the obverse surface 11 of the body 12.

Figure 5:
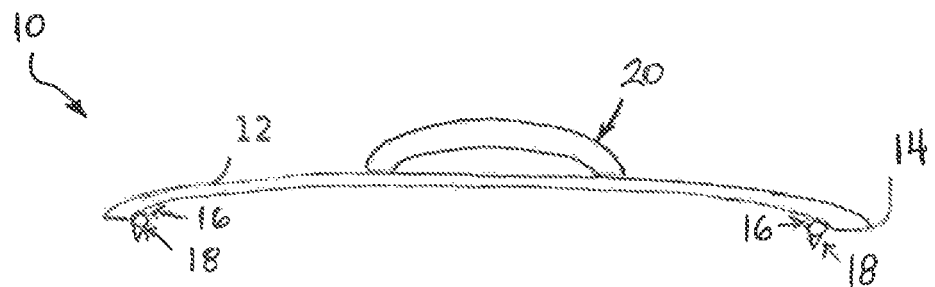
FIG. 5 is a partial side view of the guard illustrating one position of the channel and flexible gasket.
Figure 6:
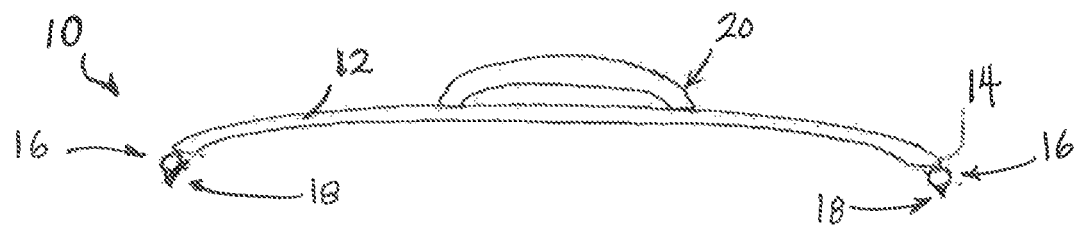
FIG. 6 is a partial side view of the guard illustrating a different position of the channel and flexible gasket.
Figure 1B:
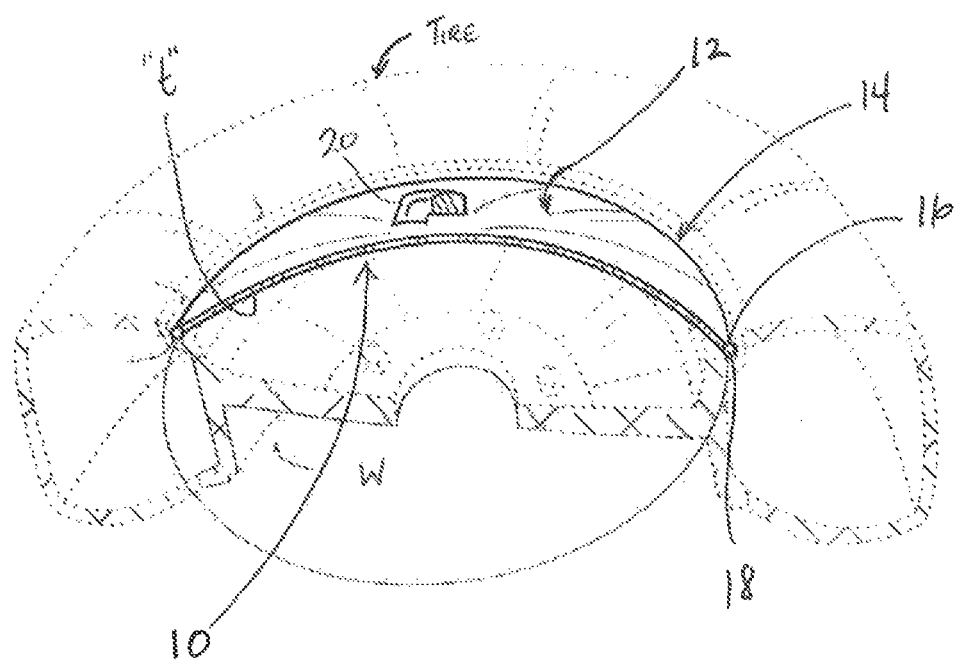
FIG. 1B is a perspective and partial view of the guard as placed over the wheel portion of a tire and wheel assembly of a vehicle or automobile.
Figure 2:
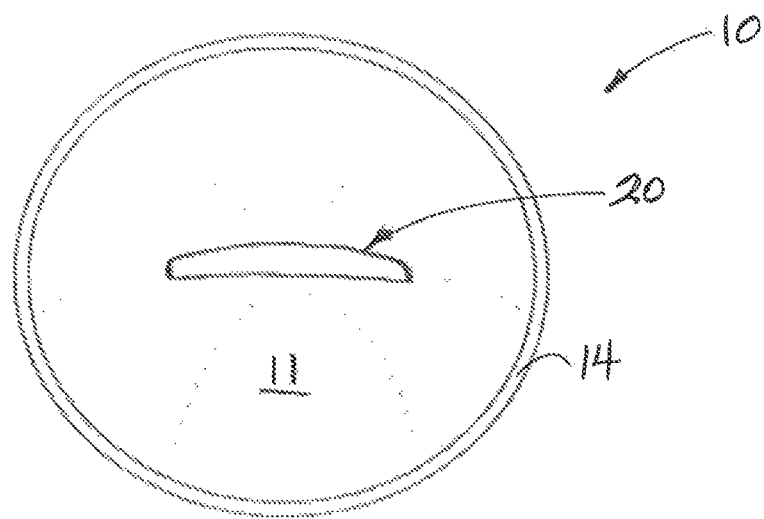
FIG. 2 is a top view of the guard of FIG. 1.
Figure 3:
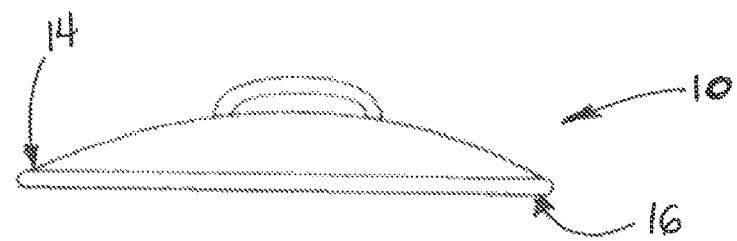
FIG. 3 is a side view of the guard of FIGS. 1 and 2.
Figure 4:
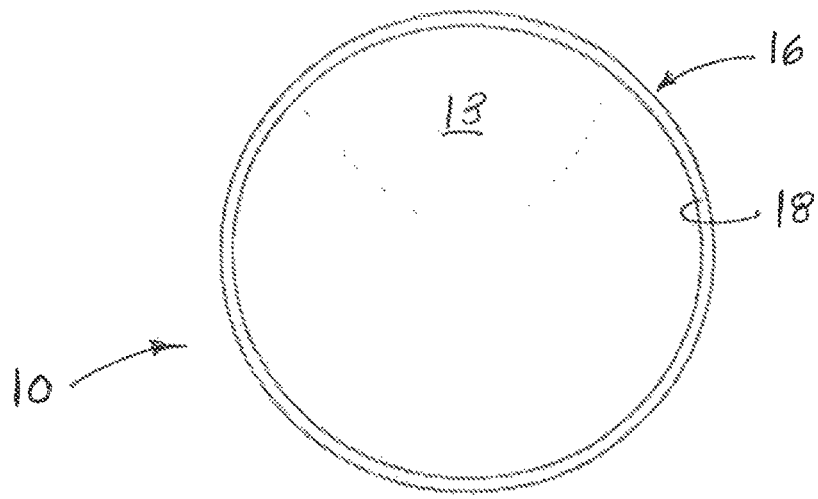
FIG. 4 is an underside view of the guard of FIGS. 1, 2, and 3.

In one embodiment, best understood in conjunction with FIG. 4 and FIG. 5, the guard 10 comprises first channel 16 that houses and retains first flexible gasket 18, with the first channel 16 (and corresponding the first flexible gasket 18) disposed and/or oriented adjacent to the outer circumferential periphery 14, but not beyond the boundary of the outer circumferential periphery 14. In another embodiment, best understood via FIG. 6, the first channel 16 (and first flexible gasket 18) is/are disposed and/or oriented as coextensive with outer circumferential periphery 14.

Figure 7:
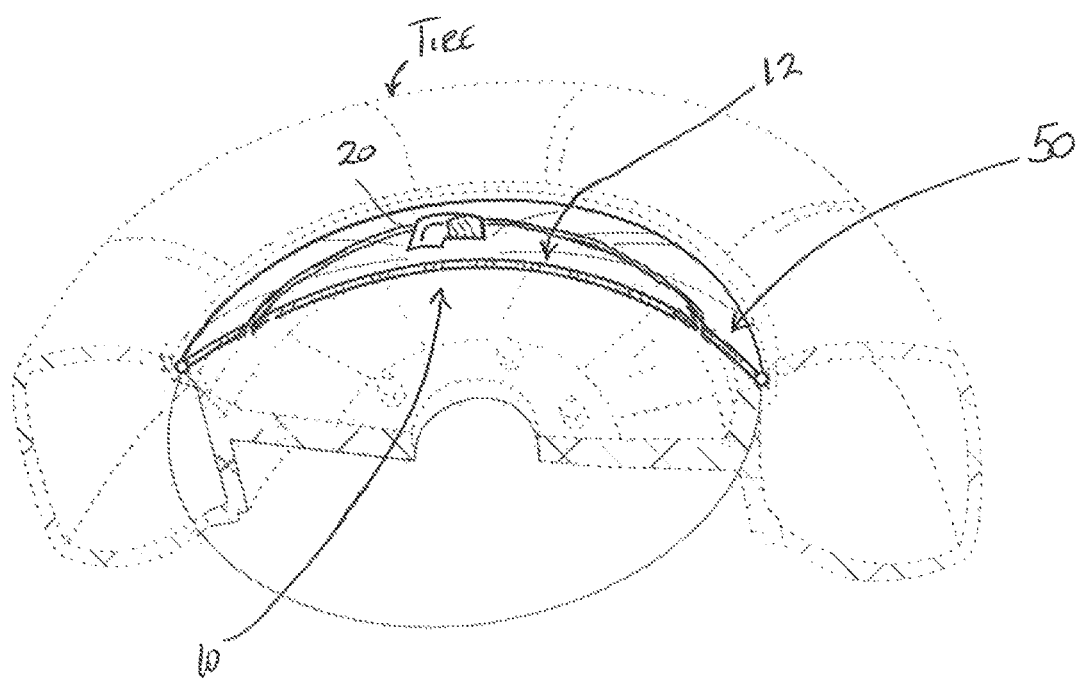
FIG. 7 is another embodiment of the guard as similarly illustrated in FIG. 6, depicting an extension attached to the body of the guard.
Figure 8:
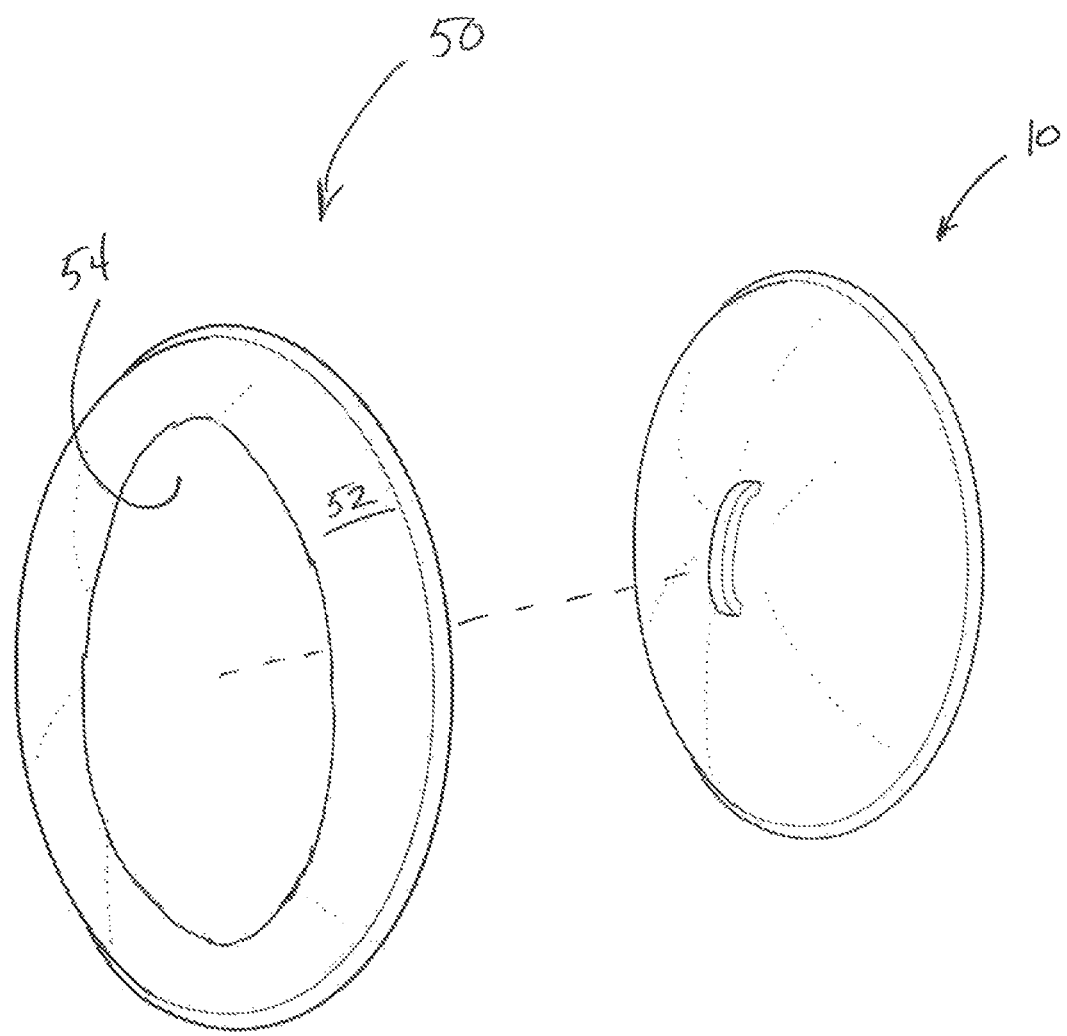
FIG. 8 is an exploded perspective view of the guard and the extension, wherein the guard is attached within and via the underside of the extension.
Figure 9:
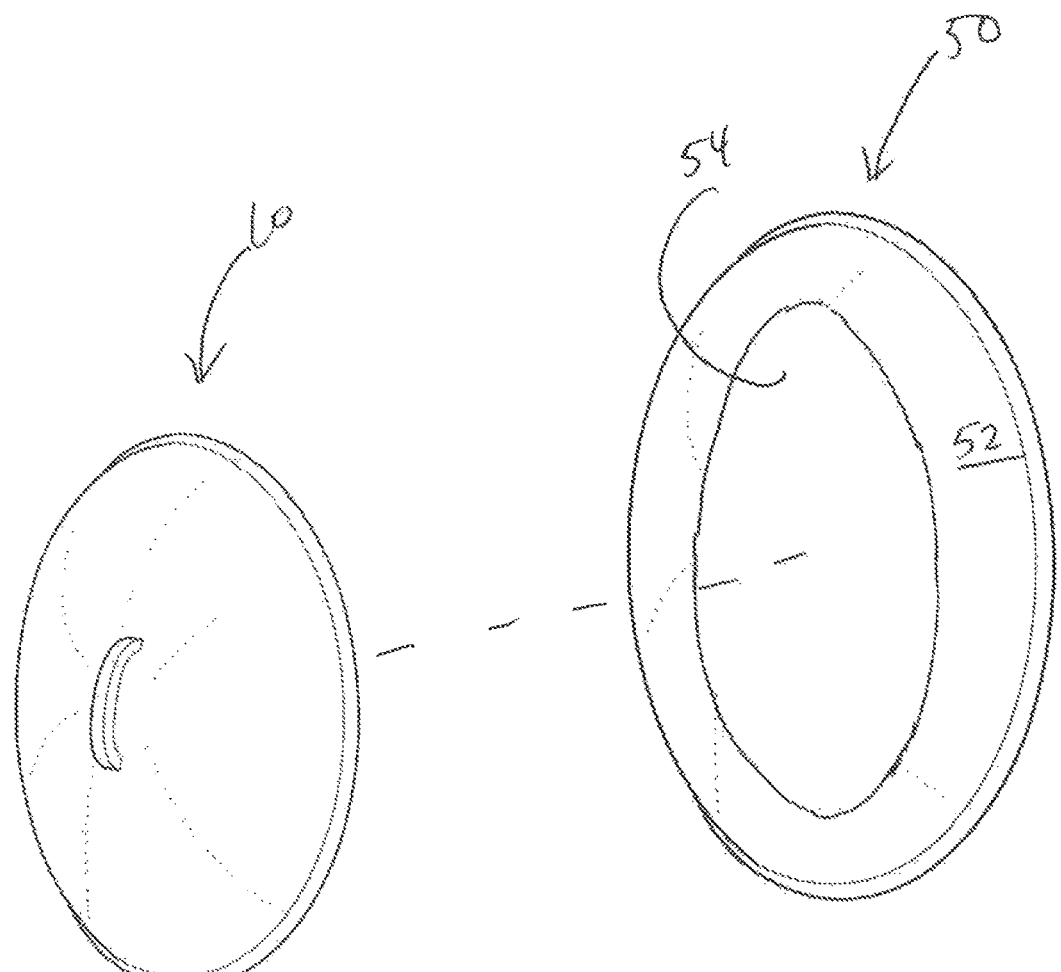
FIG. 9 is an exploded perspective view of the guard and the extension, wherein the guard is attached outside and externally to the extension.
Figure 10:
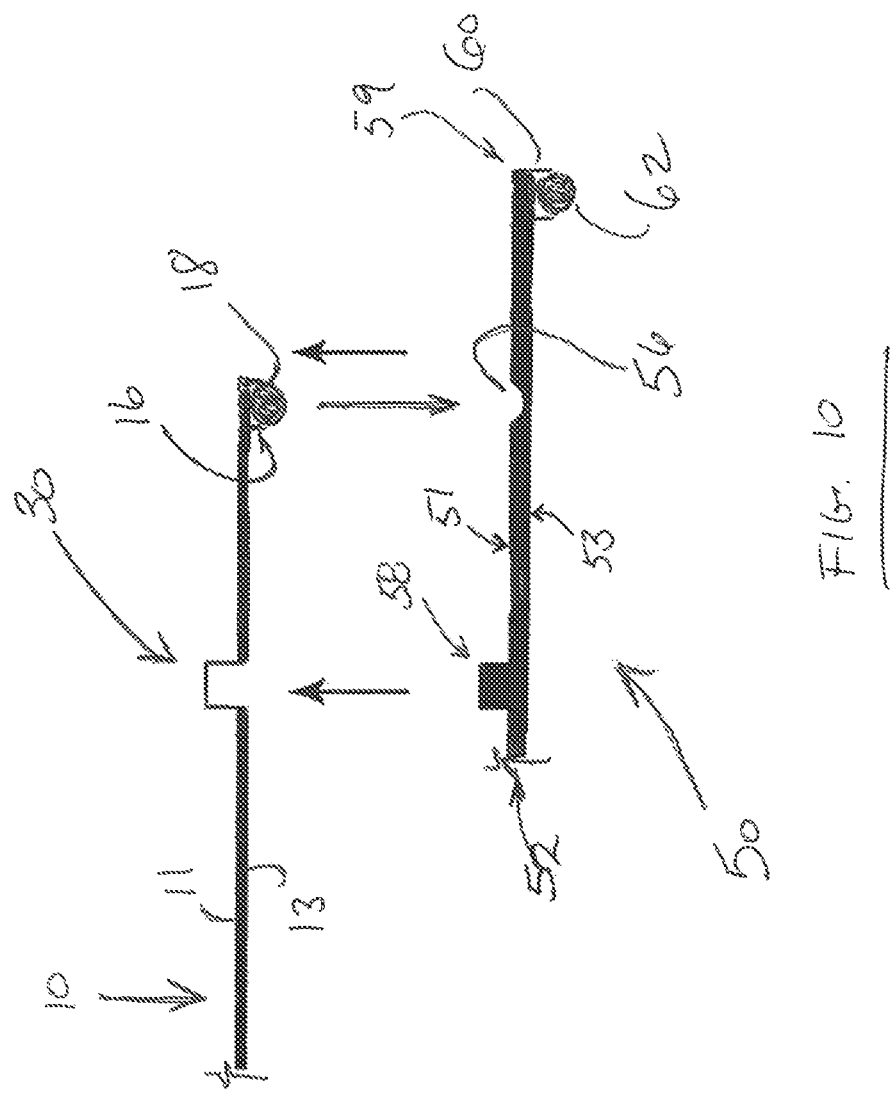
FIG. 10 is one embodiment of the extension.

In another embodiment, best understood in conjunction with FIG. 7 through FIG. 9, the guard 10 further comprises further comprising a body extension 50. The body extension 50 comprises a band 52 having a center aperture 54 adapted to accommodate the body 12 of the guard 10, either through placement of extension 50 onto the guard 10 (consistent with FIG. 8), or through placement of guard 10 onto extension 50 (consistent with FIG. 9).

It is envisioned that the combination of guard 10 and body extension 50 may be provided in a variety of dimensions. In one such embodiment, the guard 10 may comprise a diameter of approximately 14 inches through approximately 20 inches, thereby covering the standard dimensions of commercially available rims, and the body extension 50 may be provided in one or more attachable and removable elements. In such an embodiment, the body extension 50 may comprise a plurality of body extensions 50 that include a one-inch, a two-inch, a three-inch, a four-inch, a five-inch, and/or a six-inch extension 50, whereby the extension 50 is attached to the guard 10 to provide the requisite additional coverage beyond the standard dimension provided by the guard 10.

For example, as but one illustration of this envisioned embodiment, a guard 10 may comprise a 15-inch diameter suitable for covering a 15-inch diameter rim of a wheel, and may further include one or more body extensions 50 capable of extending the dimensional coverage by one-inch up to five-inches (to provide dimensional coverage in the range of 15-inches to 20-inches). This provides versatility to the embodiment by allowing an individual to have dimensional options to accommodate differently dimensioned vehicle rims that such individuals may possess or have responsibility for care and upkeep. Other variable combinations may be utilized, such as a 14-inch guard 10 with a plurality of extensions 50 ranging from one-inch to six-inches (to provide dimensional coverage in the range of 14-inches to 20-inches). Other combinations may include a guard 10 having a base dimension of 14-inches, 15-inches, 16-inches, 17-inches, or 18-inches, and includes a plurality of body extensions 50 provided in one-inch increments sufficient to provide coverage between the base dimension through a 20-inch rim.

Although the following illustrations and descriptions are directed to coupling of the guard 10 onto the extension 50, consistent with FIG. 9, similar elements and relationships are envisioned that are applicable to the embodiment illustrated in FIG. 8, with adaptation of elements and relationships envisioned suitable for extension 50 coupling onto guard 10 (as in FIG. 8).

Accordingly, consistent with FIG. 9 through FIG. 13, the extension 50 (and band 52) includes an obverse surface 51 and a reverse surface 53. The band 52 includes a first recess 56 that may be coupled to the flexible first gasket 18 disposed within the first channel 16 of the guard 10. The extension 50 (and band 52) may also include a first detent 58 projecting from the obverse surface 51 of extension 50 (and/or band 52). It is envisioned that the guard 10 (and body 12) may include a first socket 30. In one embodiment, the extension 50 and guard 10 are mutually coupled by insertion of first detent 58 into first socket 30. The first socket 30 and first detent 58 may be formed of similarly geometry with the socket 30 having a slightly larger size to accommodate insertion of detent 58 therein, but of sufficient dimension to retain the detent 58 therein under normal operation of the guard 10, and only releasing the detent 58 upon sufficient force to overcome the friction fit impingement provided. Adjacent to the outer circumferential periphery 59 of the extension 50 (and band 52), an outer channel 60 (on band 52) housing an outer flexible gasket 62 are so arranged to provide a sealing mechanism for the extension 50 (and band 52).

Figure 11:
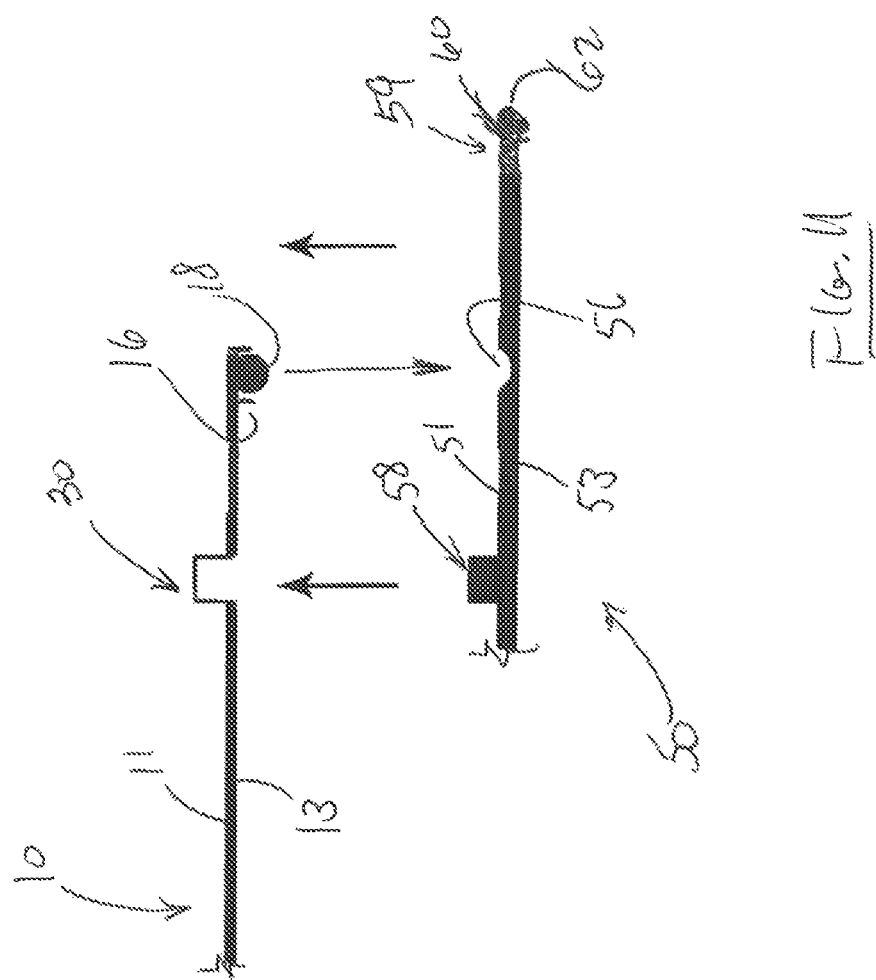
FIG. 11 is another embodiment of the extension.

As illustrated in FIG. 11, coextensive to the outer circumferential periphery 59 of extension 50 (and band 52), the outer channel 60 housing the outer flexible gasket 62 so that the gasket extends along the periphery 59.

Figure 12:
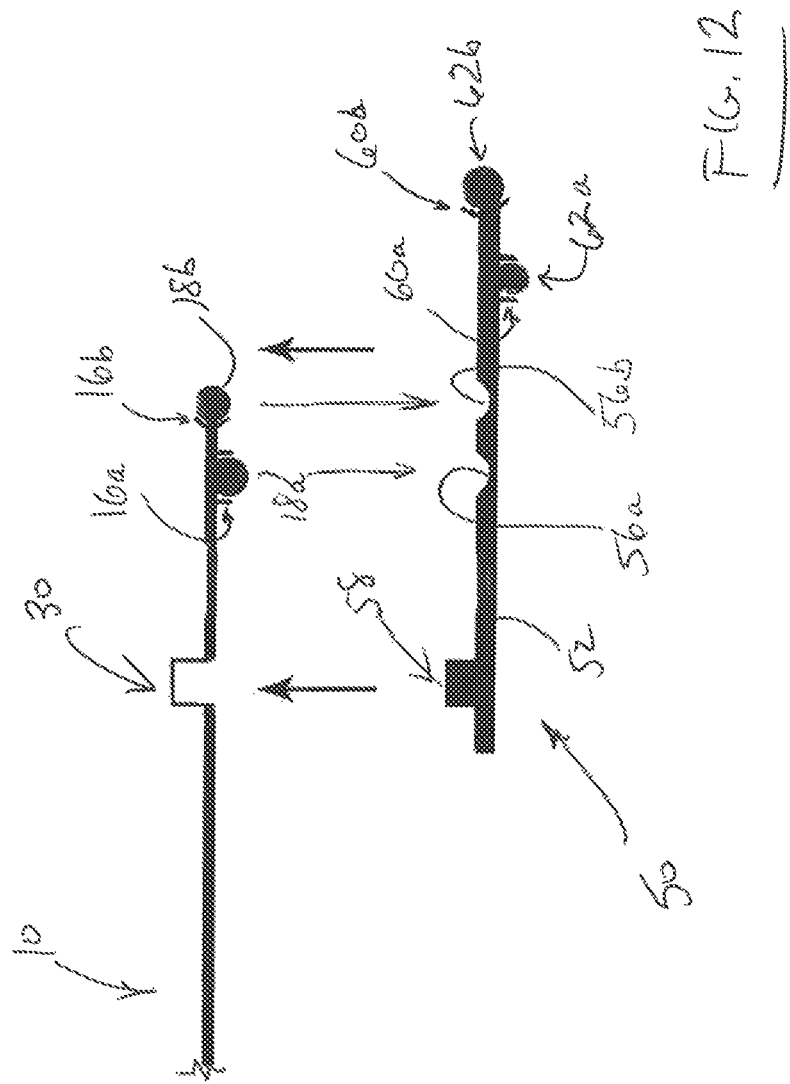
FIG. 12 is another embodiment of the extension.

As illustrated in FIG. 12, the guard 10 includes a first channel 16a housing a first flexible gasket 18a and a second channel 16b housing a second flexible gasket 18b the gaskets 18a and 18b aligned to mate with a first recess 56a and second recess 56b, respectively, as depicted. It is also envisioned that the extension 50 (and band 52) may include an inner channel 60a and an outer channel 60b, the inner channel 60a housing an inner flexible gasket 62a and the outer channel 60b housing an outer flexible gasket 62b.

Figure 13:
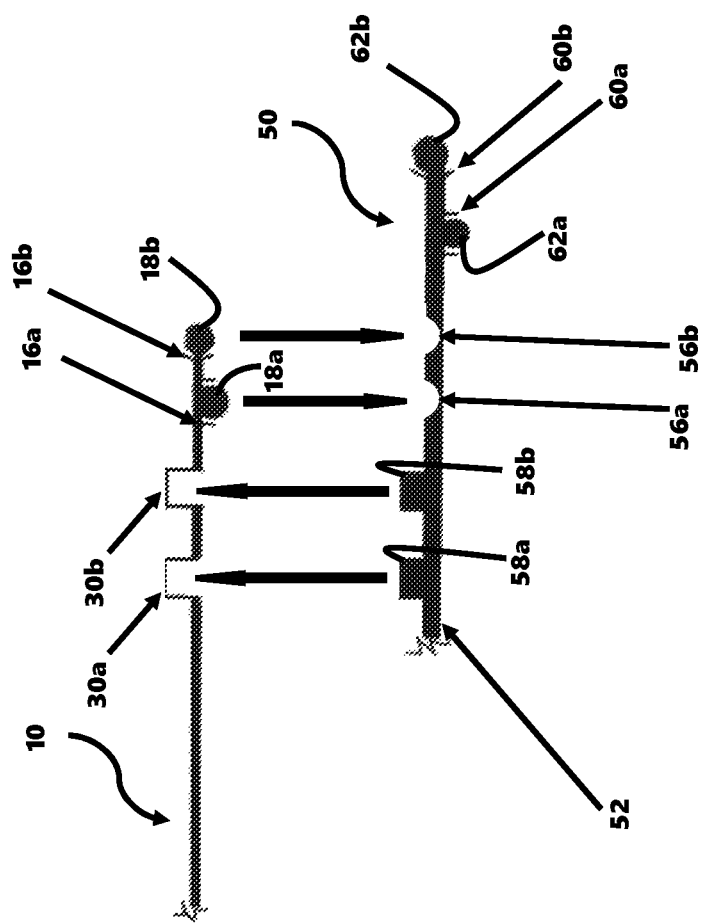
FIG. 13 is another embodiment of the extension.
Figure 14:
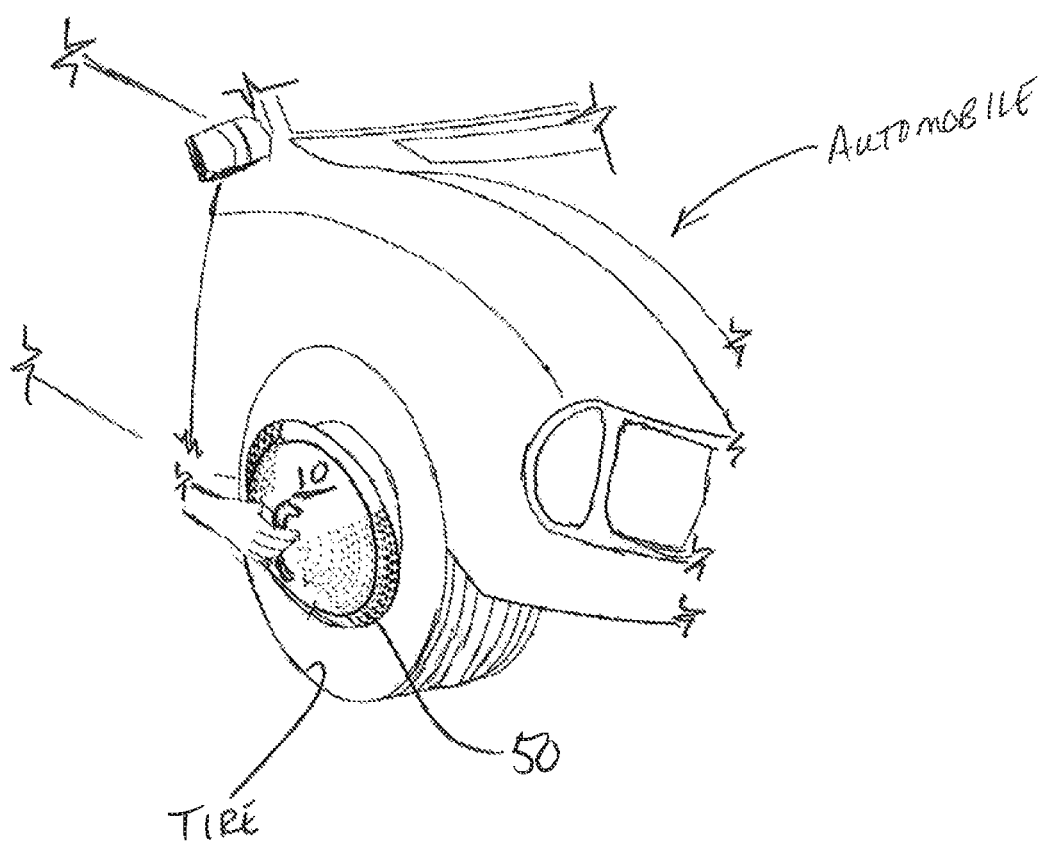
FIG. 14 is an illustration of the guard as partially applied to the tire and wheel assembly of a vehicle or automobile.

As illustrated in FIG. 13, the guard 10 includes a first channel 16a housing a first flexible gasket 18a and a second channel 16b housing a second flexible gasket 18b the gaskets 18a and 18b aligned to mate with a first recess 56a and second recess 56b, respectively, as depicted. It is also envisioned that the guard 10 includes a first socket 30a and a second 30b, the first socket 30a to receive first detent 58a and the second socket 30b to receive second detent 58b. It is also envisioned that the extension 50 (and band 52) may include an inner channel 60a and an outer channel 60b, the inner channel 60a housing an inner flexible gasket 62a and the outer channel 60b housing an outer flexible gasket 62b.

As an illustration of one method of use of the enclosed embodiments, a user (and in particular, said user's hand) is depicted as grasping the handle (20) of guard 10 with an attached body extension 50 to cover a rim of a different dimension than the base dimension of guard 10.

Figure 15:
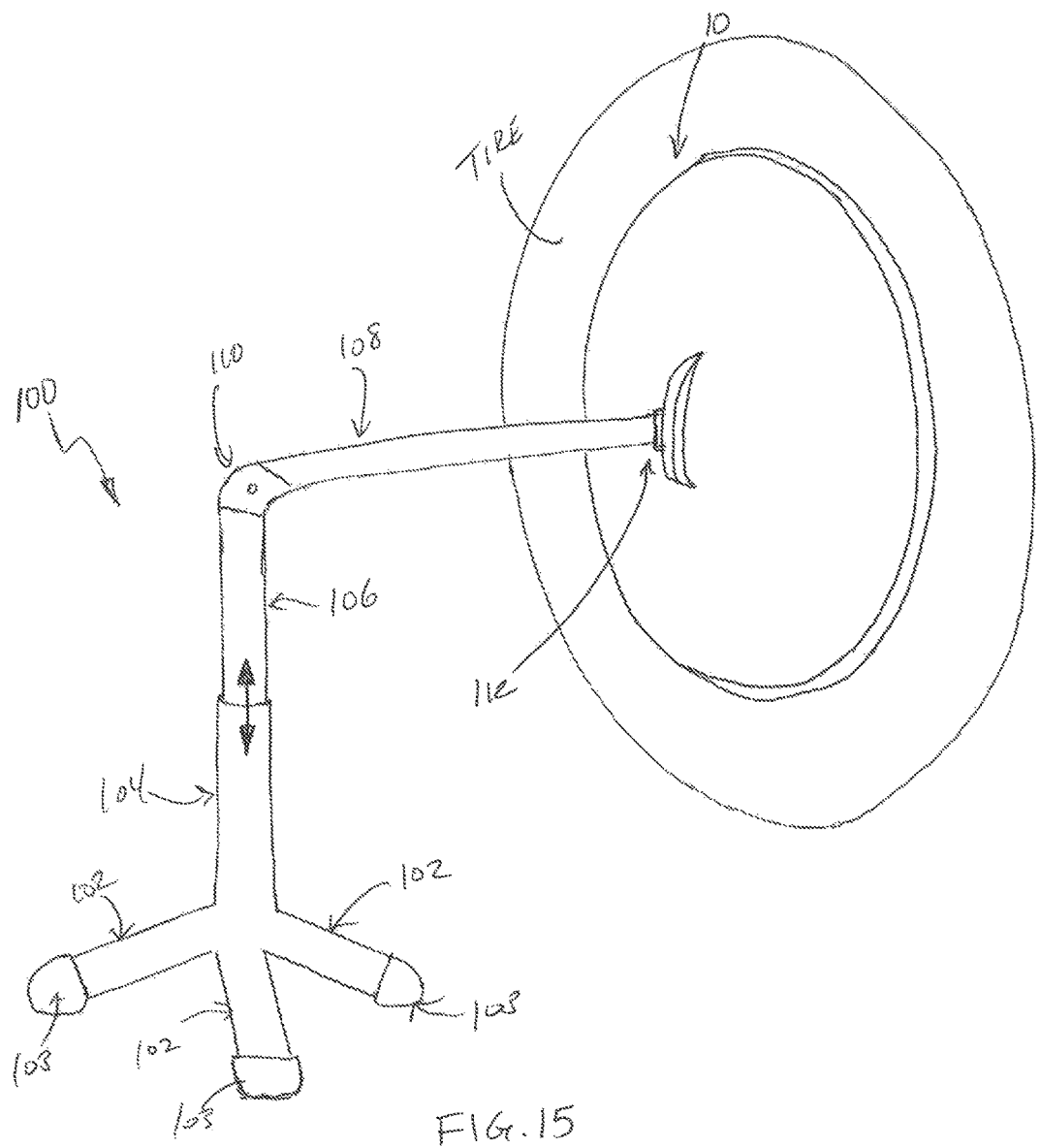
FIG. 15 is a perspective view of a holder used to attached to the guard for aligning and positioning the guard for hands-free usage.

Consistent with FIG. 15, a hands-free holder 100 may be included for placing and holding the guard 10 in place relative to the tire and wheel. In one embodiment, the holder 100 comprises a plurality of legs 102 each terminating in a foot 103, the legs 102 and feet 103 providing stability and support to the holder 100 and the guard 10. In one embodiment, there are two legs 102 and feet 103. In another embodiment, there are three legs 102 and feet 103. Other multi-leg and multi-feet embodiments are likewise envisioned without departing from the spirit of the holder 100 device.

A first post 104 is upwardly depending from the legs 102. The first post 104 may include a cylindrically formed bore for accepting a second post 106, wherein the second post 106 may be telescopically positioned within the first post 104 and manipulated along the bi-directional depicted. A horizontal arm 108 depends from the second post 106 and may be coupled or joined along an articulating hinge 110 or the like, along the arm 108 to be positioned along a range of angles relative to the guard 10 and tire and wheel assembly. A spring-loaded clip 112 may be positioned at the terminal end of arm 108, wherein the clip 112 may be attached to the handle 20 of guard 10. Through this assembly, the holder 100 may hold the guard 10 in a specific position and allow for hands-free application of cleaner.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A wheel-rim guard comprising:
   a body having an obverse surface and reverse surface, the surfaces in mutually opposed orientation and having a thickness intermediately disposed between the surfaces, the surfaces mutually terminating at an outer circumferential periphery;
   a first channel disposed within the reverse surface of the body;
   a first flexible gasket disposed within the first channel;
   a handle disposed on the obverse surface of the body; and
   a body extension comprising a band having a center aperture adapted to accommodate the body, the band having a first recess coupled to the flexible first gasket disposed within the first channel.

2. The guard of claim 1, wherein the first channel is disposed adjacent the outer circumferential periphery.

3. A wheel-rim guard comprising:
   a body having an obverse surface and reverse surface, the surfaces in mutually opposed orientation and having a thickness intermediately disposed between the surfaces, the surfaces mutually terminating at an outer circumferential periphery;
   a first channel disposed within the reverse surface of the body;
   a first flexible gasket disposed within the first channel;
   a handle disposed on the obverse surface of the body;
   a first socket disposed in the reverse surface of the body; and
   a body extension having a band, the band comprising an obverse surface and a reverse surface, the surfaces in mutually opposed orientation and terminating at an inner circumferential periphery and at an outer circumferential periphery, the inner circumferential periphery defining a center aperture adapted to accommodate the body therein, the band comprising a first detent mated to the first socket.

4. The guard of claim 3, wherein the band further comprises a first recess disposed in the obverse surface, the first recess mated with the first flexible gasket disposed within the first channel of the body.

5. The guard of claim 3, wherein the band further comprises an outer flexible gasket disposed adjacent the outer circumferential periphery.

6. The guard of claim 5, wherein the band further comprises an outer channel housing the outer flexible gasket.

7. The guard of claim 6, wherein the band further comprises an inner flexible gasket disposed along the inner circumferential periphery of the band.

8. The guard of claim 7, wherein the band further comprises an inner channel housing the inner flexible gasket.

9. The guard of claim 3, wherein the body further comprises:

a second channel disposed within the reverse surface of the body; and a second flexible gasket disposed within the second channel.

10. The guard of claim 9, wherein the band further comprises an inner first recess and an outer second recess disposed in the obverse surface, the inner first recess mated with the first flexible gasket disposed within the first channel of the body, the outer second recess mated with the second flexible gasket disposed within the second channel of the body.

11. A wheel-rim guard comprising:

a body having an obverse surface and reverse surface, the surfaces in mutually opposed orientation and having a thickness intermediately disposed between the surfaces, the surfaces mutually terminating at an outer circumferential periphery;

a first channel disposed within the reverse surface of the body and a first flexible gasket disposed within the first channel;

a second channel disposed along the outer circumferential periphery and a second flexible gasket disposed within the second channel; and a handle disposed on the obverse surface of the body.

12. The guard of claim 11 further comprising:

an inner first socket and an outer second socket formed in the reverse surface of the body; and a body extension having a band, the band comprising an obverse surface and a reverse surface, the surfaces in mutually opposed orientation and terminating at an inner circumferential periphery and at an outer circumferential periphery, the inner circumferential periphery defining a center aperture adapted to accommodate the body therein, the band comprising an inner first detent mated to the inner first socket and an outer second detent mated to the outer second socket.

13. A wheel-rim guard comprising:

a body having an obverse surface and reverse surface, the surfaces in mutually opposed orientation and having a thickness intermediately disposed between the surfaces, the surfaces mutually terminating at an outer circumferential periphery;

a first channel disposed within the reverse surface of the body;

a first flexible gasket disposed within the first channel;

a handle disposed on the obverse surface of the body; and a holder having a plurality of legs, an upstanding first post depending from the legs, a telescopically movable second post housed within the first post, a horizontal arm depending from the second post, and a spring-loaded clip at the terminal end of the horizontal arm attachable to the handle of the guard.

* * * * *